(12) United States Patent
Hirano

(10) Patent No.: US 10,983,914 B2
(45) Date of Patent: Apr. 20, 2021

(54) INFORMATION PROCESSING APPARATUS, ARITHMETIC PROCESSING DEVICE, AND METHOD FOR CONTROLLING INFORMATION PROCESSING APPARATUS

(71) Applicant: FUJITSU LIMITED, Kawasaki (JP)

(72) Inventor: Takahito Hirano, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 44 days.

(21) Appl. No.: 16/419,468

(22) Filed: May 22, 2019

(65) Prior Publication Data

US 2019/0391924 A1   Dec. 26, 2019

(30) Foreign Application Priority Data

Jun. 26, 2018   (JP) .............................. JP2018-121355

(51) Int. Cl.
*G06F 12/00* (2006.01)
*G06F 12/0891* (2016.01)

(52) U.S. Cl.
CPC .. *G06F 12/0891* (2013.01); *G06F 2212/1021* (2013.01)

(58) Field of Classification Search
CPC .................. G06F 12/0891; G06F 2212/1021
See application file for complete search history.

(56) References Cited

U.S. PATENT DOCUMENTS 6,195,674 B1 *  2/2001  Elbourne .............. G06F 9/3879
                                                            708/401
2007/0083718 A1  4/2007  Okabayashi 2008/0059715 A1 *  3/2008  Tomita ................ G06F 12/0862
                                                            711/130
(Continued)

FOREIGN PATENT DOCUMENTS

JP        10-55309       2/1998
WO     2005-050454      6/2005

OTHER PUBLICATIONS https://web.archive.org/web/20171207063144/https://en.wikipedia.org/wiki/MESI_protocol (Year: 2017).*

(Continued)

*Primary Examiner* — William E. Baughman
*Assistant Examiner* — Mohammad S Hasan
(74) *Attorney, Agent, or Firm* — Fujitsu Patent Center

(57) ABSTRACT

A tag match determination unit determines, in response to an acquisition request for predetermined data, whether predetermined data is present in a primary cache. When the predetermined data is not present in the primary cache, the move-in buffer outputs the acquisition request for the predetermined data to a secondary cache management unit or the storage device and holds determination purpose information based on state information on a predetermined area that stores therein the predetermined data. A storage processing unit determines, when an acquired response from the secondary cache management unit or the storage device is a predetermined type, based on the determination purpose information, whether or not to acquire the state information stored in the primary cache; invalidates the predetermined area when it is determined not to acquire the state information; and stores, in the predetermined area, the predetermined data included in the response.

9 Claims, 10 Drawing Sheets

(56) References Cited

U.S. PATENT DOCUMENTS

| | | | |
|---|---|---|---|
| 2011/0219208 A1* | 9/2011 | Asaad | G06F 9/06 |
| | | | 712/12 |
| 2013/0262778 A1* | 10/2013 | Ghai | G06F 12/0804 |
| | | | 711/136 |
| 2014/0040558 A1* | 2/2014 | Ajima | G06F 12/0813 |
| | | | 711/130 |
| 2017/0052890 A1* | 2/2017 | Chen | G06F 12/084 |
| 2018/0004661 A1* | 1/2018 | Umehara | G06F 12/0808 |
| 2020/0081714 A1* | 3/2020 | Britto | G06F 9/3802 |
| 2020/0192811 A1* | 6/2020 | Harnik | G06N 20/00 |

OTHER PUBLICATIONS https://web.archive.org/web/20170712142356/http://courses.cs.washington.edu/courses/cse378/09wi/lectures/lec15.pdf (Year: 2017).*

* cited by examiner

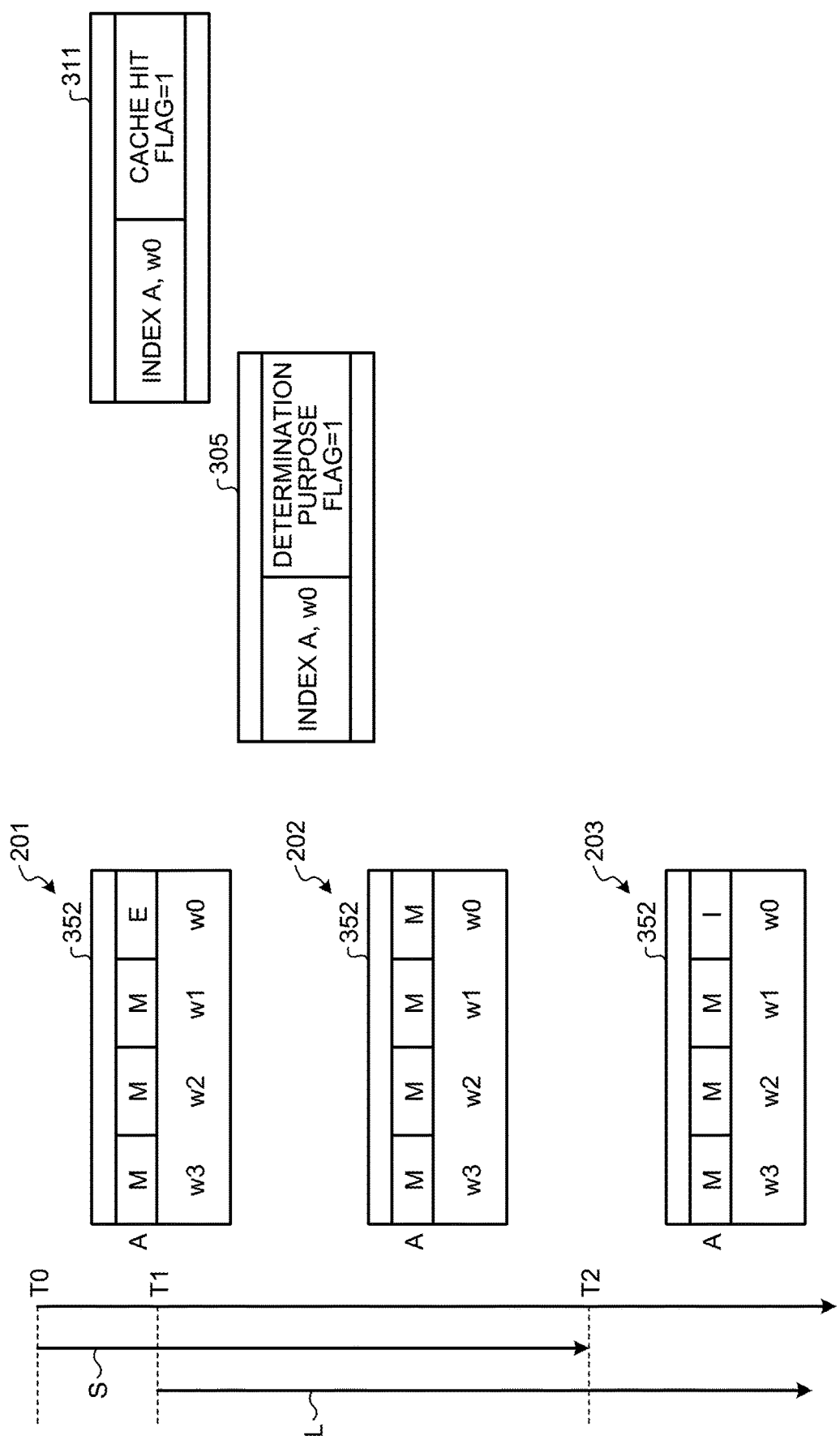

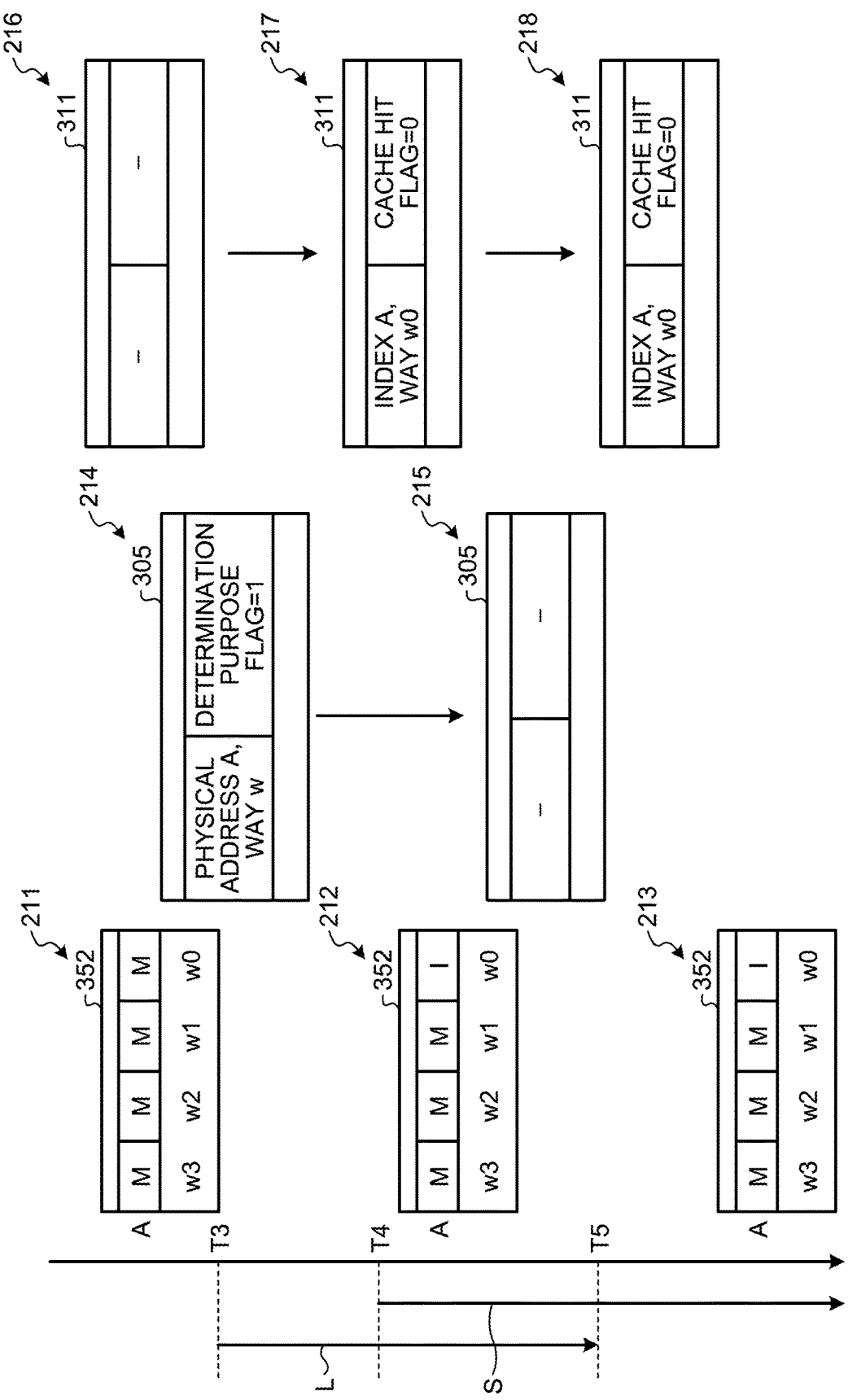

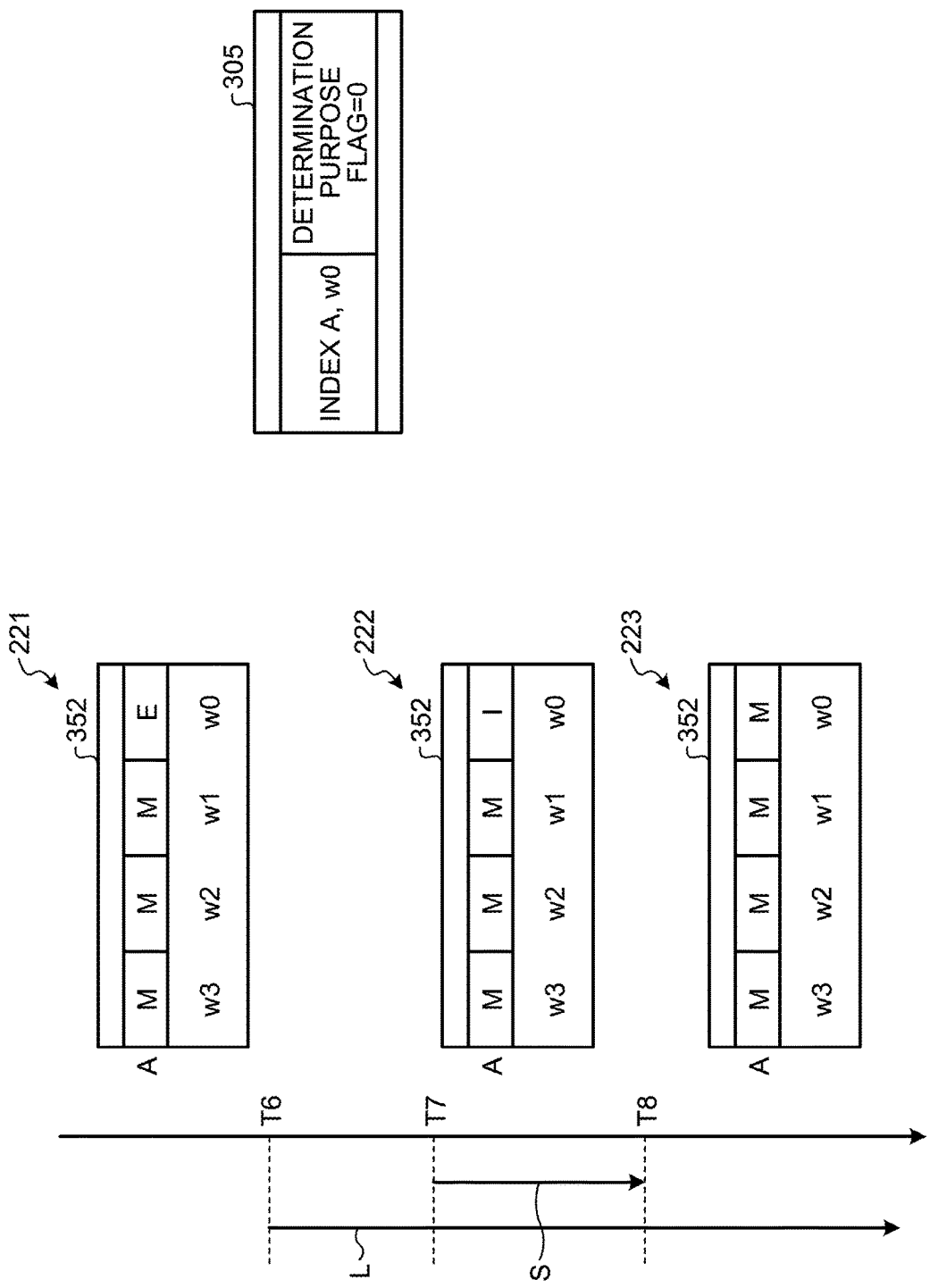

INFORMATION PROCESSING APPARATUS, ARITHMETIC PROCESSING DEVICE, AND METHOD FOR CONTROLLING INFORMATION PROCESSING APPARATUS

CROSS-REFERENCE TO RELATED APPLICATION

This application is based upon and claims the benefit of priority of the prior Japanese Patent Application No. 2018-121355, filed on Jun. 26, 2018, the entire contents of which are incorporated herein by reference.

FIELD

The embodiments discussed herein are related to an information processing apparatus, an arithmetic processing device, and a method for controlling the information processing apparatus.

BACKGROUND

A cache memory inside a processor is used to hide access latency with respect to a main memory. The processor has a secondary cache (L2 (Level-2) cache) having a relatively large amount of capacity placed on the side closer to the main memory and a primary cache (L1 (Level-1) cache) capable of accessing the interior of the core at a high speed. The structure having a plurality of caches having different amounts is called hierarchical caches.

Here, if a cache miss occurs in the primary cache, a move-in (MI) request is performed with respect to the secondary cache. Then, data in which a cache miss occurs is registered in the primary cache from the secondary cache. At this time, data coherency needs to be maintained between the hierarchical caches that use a write back system.

The processor having the hierarchical caches using the write back system uses, for example, a Modified Exclusive Shared Invalid (MESI) protocol in the primary cache and the secondary cache and maintains data coherency between hierarchies. The MESI protocol is a protocol for maintaining cache coherency by using the state of data in a cache memory called a cache state. The cache state is managed by a TAG-Random Access Memory (RAM). When the processor executes the MESI protocol, the processor monitors the cache state by accessing the TAG-RAM.

In the MESI protocol, a cache is in a state out of the following four states. An M (Modify) state indicates that a cache has been updated due to a store instruction or the like and is the state in which a write back operation is needed for updated data. An E (Exclusive) state indicates that a cache has a right to exclude in order to execute the store instruction and is the state in which a write back is not needed if a store operation has not been performed. However, if the store operation has been performed, a state transition from the E state to the M state occurs and the state becomes a state in which the cache requests the write back operation. An S (Share) state is the state in which data is held in a shared manner and there is no need to perform the write back operation. An I (Invalid) state indicates that cache data is invalid and is the state in which there is no need to perform the write back operation.

If a cache miss occurs in the primary cache, a primary cache management unit notifies a secondary cache management unit of a physical address and replacement WAY information that are to be used to register data. The secondary cache management unit performs management by determining whether the cache state of the primary cache is in the I state or in one of the states of the M state, the S state, and the E state. If the primary cache is in the I state, the secondary cache management unit issues, to the primary cache management unit, a data storage request in which movement of original data is not needed. Furthermore, if the primary cache is in one of the states of the M state, the S state, and the E state, the secondary cache management unit issues, to the primary cache management unit, a data storage request in which movement of the original data is needed. In this case, the data storage request includes therein a physical address, replacement WAY information, and code information. Then, the secondary cache management unit reads data and transfers new data to the primary cache.

If the primary cache management unit receives the data storage request in which movement of the original data is not needed, because the state of a replacement target block in the primary cache is the I state, the primary cache management unit performs a protocol check without performing an invalidation process. In contrast, if the primary cache management unit receives a data storage request in which movement of the original data is needed, because the replacement target block in the primary cache is in a valid state, the primary cache management unit reads a TAG-RAM in the primary cache one time and then checks the cache state. If the primary cache is in the M state, the primary cache management unit reads the subject data for a write back and invalidates the replacement target block while saving the data in a move out buffer (MOB). In contrast, if the primary cache is in the E state or the S state, the primary cache management unit invalidates the replacement target block without performing the write back. Then, after having invalidated the replacement target, the primary cache management unit registers, in the primary cache, data that has been transferred from the secondary cache and that is to be stored and then ends the replacement process.

Furthermore, as a technology for maintaining cache coherency, there is a conventional technology described below. There is a conventional technology for providing a flag indicating whether data in a lower level cache is present in a cache line of a higher level, sending a notification to the higher level cache when replacement of the line occurs in the lower level cache, and setting the flag in a case where the line is present in the higher level cache. Furthermore, there is a conventional technology for writing back, to a memory, line data in a cache entry in which a dirty flag has been set.

Patent Document 1: Japanese Laid-open Patent Publication No. 10-55309

Patent Document 2: International Publication Pamphlet No. WO 2005/050454

However, if a data storage request in which movement of the original data is needed is received from the secondary cache management unit, the primary cache management unit reads a TAG-RAM by a first access to the TAG-RAM and checks the state of the primary cache. Then, the primary cache management unit invalidates the TAG-RAM by a second access to the TAG-RAM. In this way, if the primary cache management unit receives the data storage request in which movement of the original data is needed from the secondary cache management unit, the primary cache management unit performs the access to the TAG-RAM two times. The access to the TAG-RAM is a pipeline process and, a cycle for checking the state is included in access time with respect to the TAG-RAM. Thus, the process for accessing the TAG-RAM is the process that takes time and the time taken to access the TAG-RAM may possibly reduce the processing performance of the arithmetic processing device at the time of primary cache miss.

If the primary cache is in the M state, because a write back is performed, the access to the TAG-RAM is performed twice in order to save the data. However, if the primary cache is in the E state or the S state, it is sufficient for the TAG-RAM to be invalidated. It can be said that the access to the TAG-RAM performed two times causes a useless delay and reduces the processing performance of the information processing apparatus.

Here, even in a case of using the conventional technology for providing a flag indicating whether data in a lower level cache is present in a cache line of a higher level, this does not influence the number of accesses to the TAG-RAM in a case of the M state and it is thus difficult to improve the performance of the information processing apparatus. Furthermore, even in a case of also using the conventional technology for controlling, by using the dirty flag, a write back with respect to the memory, the number of accesses to the TAG-RAM in a case of the M state is not considered and it is thus difficult to improve the performance of the information processing apparatus.

SUMMARY

According to an aspect of an embodiment, an information processing apparatus includes a plurality of arithmetic processing devices. each of the arithmetic processing devices includes a cache memory that holds data and state information on an area in which the data is stored, a determination unit that determines, in response to an acquisition request for predetermined data, whether the predetermined data is present in the cache memory, a control unit that outputs, when the predetermined data is not present in the cache memory, the acquisition request for the predetermined data to a low level cache memory at a level lower than the cache memory or to a storage device and that holds determination purpose information based on the state information on a predetermined area that stores therein the predetermined data, and a storage processing unit that acquires a response to the acquisition request from the low level cache memory or the storage device, that determines, when the acquired response is a predetermined type, based on the determination purpose information held by the control unit, whether the state information stored in the cache memory is to be acquired, that invalidates the predetermined area when the storage processing unit determines not to acquire the state information, and that stores, in the predetermined area, the predetermined data included in the response.

The objective and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating a transition of an L1 tag when contention occurs in a state in which a store instruction is preceded;

FIG. 9 is a diagram illustrating transition of the L1 tag when contention occurs in a state in which a load instruction is preceded; and FIG. 10 is a diagram illustrating transition of the L1 tag when contention occurs in a case where a store buffer is not used.

DESCRIPTION OF EMBODIMENTS

Preferred embodiments of the present invention will be explained with reference to accompanying drawings. Furthermore, the information processing apparatus, the arithmetic processing device, and the method for controlling the information processing apparatus disclosed in the present invention are not limited to the embodiments described below.

[a] First Embodiment

Figure 1:
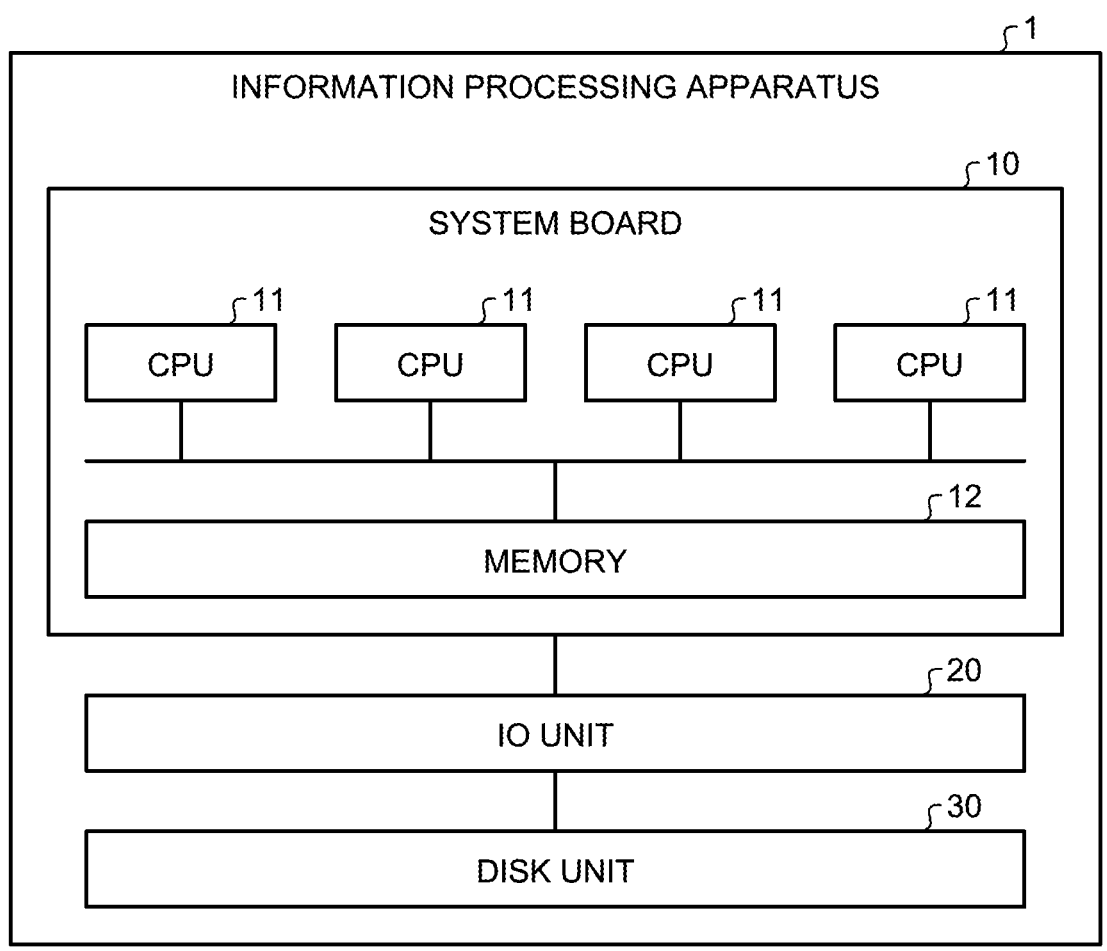
FIG. 1 is a diagram illustrating a hardware configuration of an information processing apparatus.

FIG. 1 is a diagram illustrating a hardware configuration of an information processing apparatus. An information processing apparatus 1, such as a server, includes a system board 10, an input-output (IO) unit 20, and a disk unit 30.

On the system board 10, a plurality of CPUs 11 and a memory 12 are mounted. The system board 10 is connected to the IO unit 20 by a bus. The CPUs 11 and the memory 12 mounted on the system board 10 perform communication with the IO unit 20 via the bus that connects the system board 10 and the IO unit 20.

The CPUs 11 that are arithmetic processing devices send and receive data to and from the disk unit 30 via the IO unit 20. Furthermore, the CPUs 11 are connected to the memory 12 that is a main storage device via the bus. The CPUs 11 read various programs stored in the disk unit 30 and executes the programs in the memory 12, thereby operating an operating system (OS) and applications. Here, in the embodiment, four pieces of the CPUs 11 are illustrated as an example; however, the number of the CPUs 11 is not particularly limited.

The IO unit 20 performs control of reading and writing of data with respect to the disk unit 30. The disk unit 30 is an auxiliary storage device. The disk unit 30 stores therein various programs, such as an OS and applications.

Figure 2:
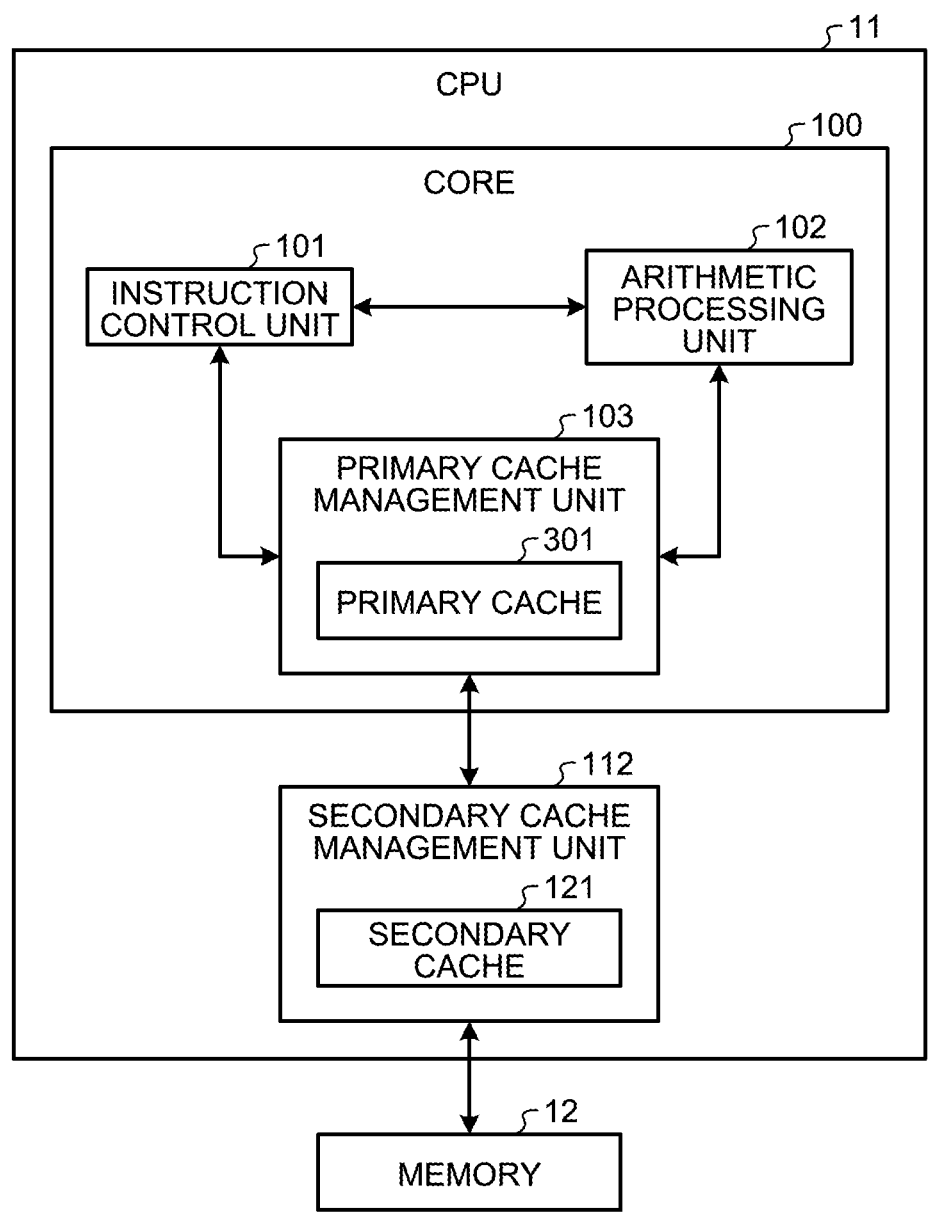
FIG. 2 is a block diagram illustrating a CPU.

FIG. 2 is a block diagram illustrating a CPU. The CPU 11 includes a core 100 and a secondary cache management unit 112.

The core 100 includes an instruction control unit 101, an arithmetic processing unit 102, and a primary cache management unit 103. The instruction control unit 101, the arithmetic processing unit 102, and the primary cache management unit 103 are connected with each other and perform communication with each other.

The instruction control unit 101 generates various instructions at the time of executing a program. Then, the instruction control unit 101 outputs an instruction to execute arithmetic processing to the arithmetic processing unit 102.

Thereafter, the instruction control unit 101 acquires, from the arithmetic processing unit 102, a response to the output execution instruction.

Furthermore, the instruction control unit 101 sends a load instruction or a store instruction to store a cache to the primary cache management unit 103. Then, the instruction control unit 101 acquires a response to the sent load instruction or the store instruction from the primary cache management unit 103.

The arithmetic processing unit 102 receives an input of an instruction to execute the arithmetic processing from the instruction control unit 101. Furthermore, the arithmetic processing unit 102 acquires data from the primary cache management unit 103. Then, the arithmetic processing unit 102 executes an arithmetic operation in accordance with the execution instruction by using the data acquired from the primary cache management unit 103.

The primary cache management unit 103 includes a primary cache 301. The primary cache management unit 103 receives an input of a load instruction to load a cache from the instruction control unit 101. Then, the primary cache management unit 103 determines whether the data designated by the load instruction is present in the primary cache 301. In a case of a cache hit indicating that the designated data is present in the primary cache 301, the primary cache management unit 103 reads the designated data from the primary cache 301 and outputs the data to the arithmetic processing unit 102. Then, the primary cache management unit 103 notifies the instruction control unit 101 of the completion of the process of the load instruction to load the cache.

In contrast, in a case of a cache miss indicating that the data designated by the load instruction is not present in the primary cache 301, the primary cache management unit 103 sends a move-in request to the secondary cache management unit 112. Then, the primary cache management unit 103 receives an input of the data designated by the load instruction and a data storage request from the secondary cache management unit 112. Then, the primary cache management unit 103 performs a process on the primary cache 301 in accordance with the data storage request and stores the received data in the primary cache 301. Thereafter, the primary cache management unit 103 again executes the load instruction to load the cache and executes a process to be performed in a case where a cache hit occurs. Thereafter, the primary cache management unit 103 notifies the instruction control unit 101 of the completion of the process of the load instruction to load the cache.

Furthermore, the primary cache management unit 103 receives an input of the store instruction to load a cache from the instruction control unit 101. Then, the primary cache management unit 103 determines whether the data designated by the store instruction is present in the primary cache 301. If the data designated by the store instruction is not present in the primary cache 301, the primary cache management unit 103 newly registers data in the primary cache 301. Furthermore, the primary cache management unit 103 holds the registered data and asks, if a predetermined condition is satisfied, the secondary cache management unit 112 to write the data to a secondary cache 121. Furthermore, if the data designated by the store instruction is present in the primary cache 301, the primary cache management unit 103 updates the data in the primary cache 301. Furthermore, the primary cache management unit 103 holds the updated data and asks, if a predetermined condition is satisfied, the secondary cache management unit 112 to write the data to the secondary cache 121.

The secondary cache management unit 112 includes the secondary cache 121. The operation speed of the secondary cache 121 is lower than that of the primary cache but the capacity of the secondary cache 121 is large. The secondary cache 121 holds information indicating whether the cache state of each area in the primary cache 301 is the I state.

The secondary cache management unit 112 receives an input of the move-in request from the primary cache management unit 103. Then, the secondary cache management unit 112 determines whether the data designated by the move-in request is present in the secondary cache 121.

If the designated data is present in the secondary cache, the secondary cache management unit 112 checks the cache state in the area at the storage destination of the designated data in the primary cache 301. If the cache state is the I state, the secondary cache management unit 112 generates a data storage request in which movement of the original data is not performed. In a description below, data storage request in which movement of the original data obtained at the time of registration of the data is not needed is referred to as a "movement unneeded storage request". Then, the secondary cache management unit 112 outputs the data designated by the move-in request to the primary cache management unit 103 together with the movement unneeded storage request.

In contrast, if the cache state is other than the I state, the secondary cache management unit 112 generates a data storage request in which movement of the original data is needed. In a description below, the data storage request in which movement of the original data is needed is referred to as a "movement needed storage request". Then, the secondary cache management unit 112 outputs the data designated by the move-in request to the primary cache management unit 103 together with the movement needed storage request.

In contrast, if the designated data is not in the secondary cache, the secondary cache management unit 112 acquires the designated data from the memory 12. Then, the secondary cache management unit 112 stores the acquired data in the secondary cache 121. Thereafter, the secondary cache management unit 112 executes the same process as that performed in a case in which the data designated by the instruction is present in the secondary cache. The secondary cache management unit 112 mentioned here corresponds to an example of a "lower level storage device".

Figure 3:
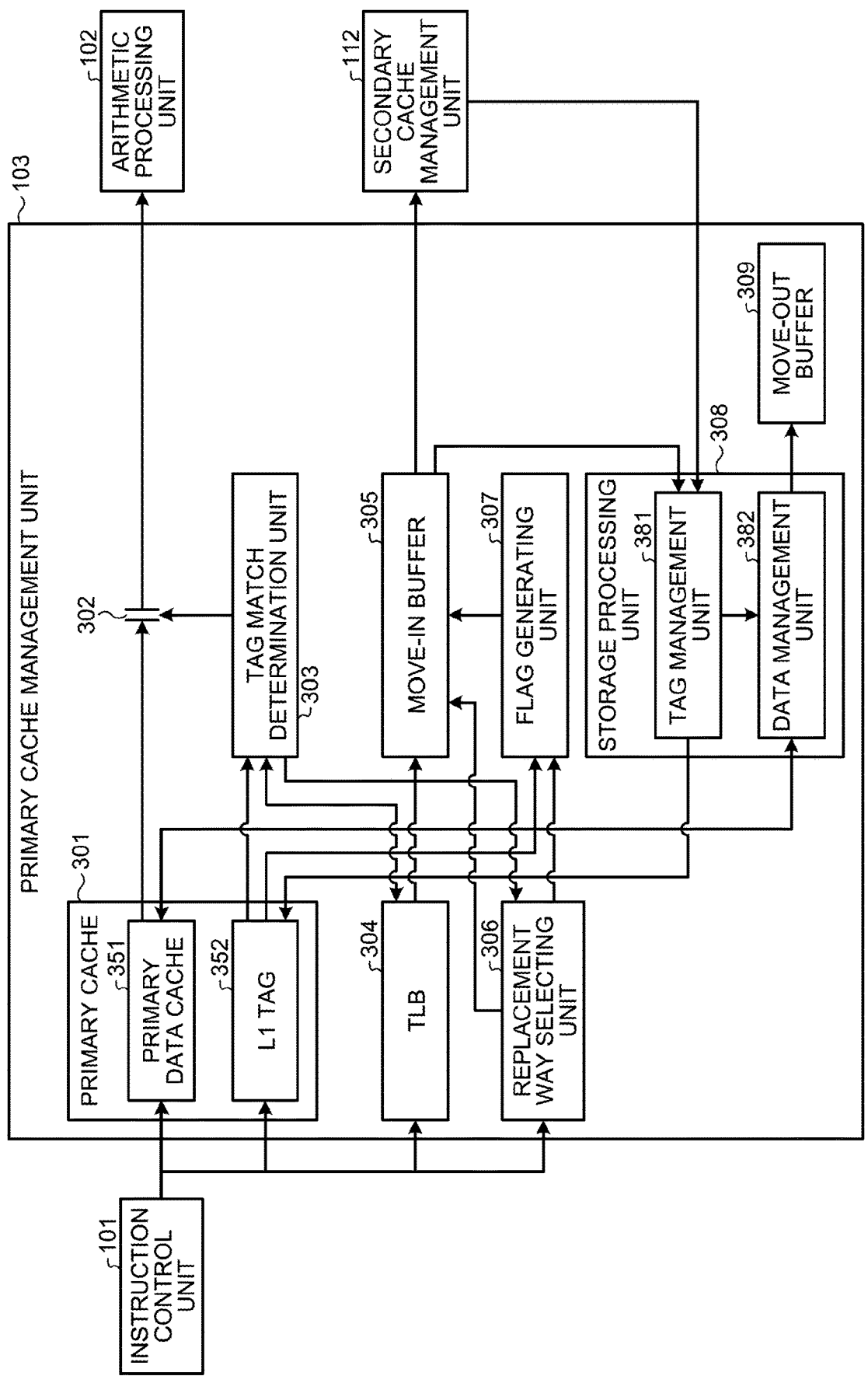
FIG. 3 is a block diagram illustrating a primary cache management unit according to a first embodiment.

In the following, the primary cache management unit 103 will be described in detail with reference to FIG. 3. FIG. 3 is a block diagram illustrating the primary cache management unit according to the first embodiment. As illustrated in FIG. 3, the primary cache management unit 103 includes the primary cache 301, a selector 302, a tag match determination unit 303, and a translation lookaside buffer (TLB) 304. Furthermore, the primary cache management unit 103 includes a move-in buffer 305 that manages rewriting of a cache, a replacement way selecting unit 306, a flag generating unit 307, a storage processing unit 308, and a move-out buffer 309.

The primary cache 301 includes a primary data cache 351 and an L1 tag 352. The primary data cache 351 is a storage area for storing data. The primary data cache 351 mentioned here corresponds to an example of a "data storage unit". Furthermore, the L1 tag 352 is a storage area for storing a tag that is address information associated with the data stored in the primary data cache 351. The L1 tag 352 mentioned here corresponds to an example of a "tag storage unit". Then, the tag corresponds to an example of "search information". A pair of the data stored in the primary cache 301 and the tag associated with the data corresponds to a cache line.

In the embodiment, the primary cache 301 uses a set associative system, in which caches are collectively stored in a block for each index and the number of areas capable of storing the blocks is referred to as a way. In the primary cache 301, four-way data can be stored in the same index. In a description below, an area that stores therein each of the pieces of data in the primary data cache 351 is referred to as a block.

Furthermore, the L1 tag 352 holds valid information indicating whether valid data is included in a cache line and control information indicating a cache state, such as a state of data held in each of the blocks in the primary data cache 351.

Here, the cache state held by the L1 tag 352 is information used for controlling cache coherency for the MESI protocol. The M state, the E state, the S state, and the I state are present for the cache state. The M state indicates a state in which blocks are held in a modification type. The E state indicates a state in which blocks are held in an exclusive type. The S state indicates a state in which blocks are held in a shared type. The I state indicates a state in which blocks are not held. These cache states mentioned here correspond to an example of "state information".

Each of the primary data cache 351 and the L1 tag 352 included in the primary cache 301 receives an input of the load instruction to load a cache output from the instruction control unit 101. In response to the input of the load instruction to load the cache, the L1 tag 352 outputs, to the tag match determination unit 303 and the flag generating unit 307, a tag indicating a way that stores data designated by the load instruction.

If a tag match has been confirmed by the tag match determination unit 303, which will be described later, the primary data cache 351 outputs the data associated with the matched tag to the arithmetic processing unit 102 via the selector 302.

The TLB 304 includes a content addressable memory for acquiring, for example, a physical address from a logical address. The TLB 304 acquires a logical address of the data to be loaded at the storage destination from the load instruction to load the cache output from the instruction control unit 101. Then, the TLB 304 acquires the physical address associated with the acquired logical address. Then, the TLB 304 outputs the acquired physical address to the tag match determination unit 303. Thereafter, if a notification of a tag mismatch has been received from the tag match determination unit 303, the TLB 304 outputs the acquired physical address to the move-in buffer 305.

The tag match determination unit 303 receives an input of information on the tag from the L1 tag 352. Furthermore, the tag match determination unit 303 receives an input of the physical address from the TLB 304. Then, the tag match determination unit 303 uses the information on the tag and the information on the physical address, checks whether the data designated by the load instruction is present in the primary data cache 351, and determines, if the data is present, that a tag match has occurred. In a case of a tag match, the tag match determination unit 303 sends the information on the tag in which the tag match has occurred to the selector 302.

Furthermore, if the data designated by the load instruction is not present in the primary data cache 351, the tag match determination unit 303 determines that a tag mismatch has occurred. Then, the tag match determination unit 303 notifies the TLB 304 and the replacement way selecting unit 306 of the tag mismatch. The tag match determination unit 303 mentioned here corresponds to an example of a "determination unit".

The selector 302 receives an input of the information the tag related to the data that is to be output from the tag match determination unit 303. Then, the selector 302 selects the data associated with the acquired tag from the primary data cache 351 and outputs the selected data to the arithmetic processing unit 102.

The replacement way selecting unit 306 receives an input of the load instruction to load a cache issued by the instruction control unit 101. If the replacement way selecting unit 306 receives the notification of the tag mismatch from the tag match determination unit 303, the replacement way selecting unit 306 selects a way that is used to store new data in accordance with a predetermined algorithm for selecting a way. For example, the replacement way selecting unit 306 selects, as a replacement way, the way having the oldest timing at which the data was stored in the primary cache 301. Then, the replacement way selecting unit 306 outputs the information on the selected way to the move-in buffer 305 and the flag generating unit 307. Hereinafter, the way that is to be used as the storage destination of the data designated by the load instruction selected by the replacement way selecting unit 306 is referred to as a "storage destination way".

The flag generating unit 307 acquires the information on the storage destination way from the replacement way selecting unit 306. Then, the flag generating unit 307 uses the acquired information on the storage destination way and acquires the cache state of the block included in the storage destination way from the L1 tag 352.

Then, if the acquired cache state is the M state, the flag generating unit 307 sets 1 indicating the M state as the value of the determination purpose flag associated with the acquired way. The determination purpose flag indicates that, if the value is 1, the cache state needs to be checked with respect to the L1 tag 352.

In contrast, if the acquired cache state is other than the M state, the flag generating unit 307 sets 0 indicating the state other than the M state as the value of the determination purpose flag associated with the subject way. If the value is 0, the determination purpose flag indicates that the cache state does not need to be checked with respect to the L1 tag 352. Then, the flag generating unit 307 outputs the determination purpose flag associated with the storage destination way to the move-in buffer 305.

The move-in buffer 305 receives an input of the physical address of the data designated by the load instruction to load the cache from the TLB 304. Furthermore, the move-in buffer 305 receives an input of information on the storage destination way from the replacement way selecting unit 306. Furthermore, the move-in buffer 305 receives an input of the determination purpose flag associated with the storage destination way from the flag generating unit 307. Then, the move-in buffer 305 outputs, to the secondary cache management unit 112, the physical address of the data designated by the load instruction to load the cache and a move-in request that includes the information on the storage destination way. The move-in buffer 305 mentioned here corresponds to an example of a "control unit". Furthermore, the determination purpose flag corresponds to an example of "determination purpose information". Furthermore, the move-in request corresponds to an example of an "acquisition request".

The storage processing unit 308 includes a tag management unit 381 and a data management unit 382. The tag management unit 381 receives, from the secondary cache management unit 112, an input of a data storage request that is a response to the move-in request and an input of the data designated by the load instruction that are output from the move-in buffer 305. Hereinafter, the data designated by the load instruction is referred to as "target data". Then, the storage processing unit 308 determines whether the acquired data storage request is a movement unneeded storage request or a movement needed storage request.

If the acquired data storage request is a movement unneeded storage request, the tag management unit 381 acquires, from the L1 tag 352, the cache state of the block that stores therein the target data in the storage destination way. Then, the tag management unit 381 checks that the cache state is the I state, performs a protocol process, and then asks a data management unit 328 to store the data. Thereafter, the tag management unit 381 generates a tag indicating the target data that is newly stored in the primary data cache 351, registers the generated tag in the L1 tag 352, and, furthermore, registers the S state as the cache state of the block of the way in which the target data has been stored.

In contrast, if the acquired data storage request is a movement needed storage request, the tag management unit 381 acquires the value of the determination purpose flag of the storage destination way from the move-in buffer 305. The movement needed storage request mentioned here corresponds to an example of a "predetermined type response" and "data movement request type response". Then, if the value of the determination purpose flag is 1, because the cache state is likely to be the M state, the tag management unit 381 acquires, from the L1 tag 352, the cache state of the block that is to be used to store the target data in the storage destination way. Then, if the cache state is the M state, the tag management unit 381 instructs the data management unit 382 to save the data.

Thereafter, if the process of saving the data has been completed, the tag management unit 381 invalidates the L1 tag 352 in the block that stores therein the target data included in the storage destination way. Then, the tag management unit 381 stores the target data acquired from the secondary cache management unit 112 in the block of the storage destination in the storage destination way. Furthermore, the tag management unit 381 generates a tag indicating the stored target data, registers the tag in the L1 tag 352, and, furthermore, registers the S state as the cache state of the block of the way in which the target data has been stored.

In contrast, in a case where the value of the determination purpose flag is 0, because the cache state is not the M state, the tag management unit 381 invalidates the L1 tag 352 in the block that stores therein the target data in the storage destination way. The case where the value of the determination purpose flag is 0 corresponds to an example of a "case in which the determination purpose information indicates the state in which predetermined data is present in a cache memory at a lower level or a storage device". Then, the tag management unit 381 asks the data management unit 328 to store the data. Thereafter, the tag management unit 381 generates a tag indicating the stored target data, registers the generated tag in the L1 tag 352, and, furthermore, registers the S state as the cache state of the block in the way in which the target data has been stored.

The data management unit 382 receives an instruction to save the data from the tag management unit 381. Then, the data management unit 382 reads, from the primary data cache 351, existing data in the block of the storage destination of the target data designated by the data storage request and allows the move-out buffer 309 to save the data.

Furthermore, the data management unit 382 receives a request for storing the data from the tag management unit 381. Then, the data management unit 382 stores the target data acquired from the secondary cache management unit 112 in the storage destination way.

The move-out buffer 309 receives, from the data management unit 382, an input of the existing data that has been present in the block that stores therein the target data included in the storage destination way. Then, the move-out buffer 309 holds the acquired existing data until the predetermined condition is satisfied and a write back to the secondary cache 121 is performed by the primary cache management unit 103.

Figure 4:
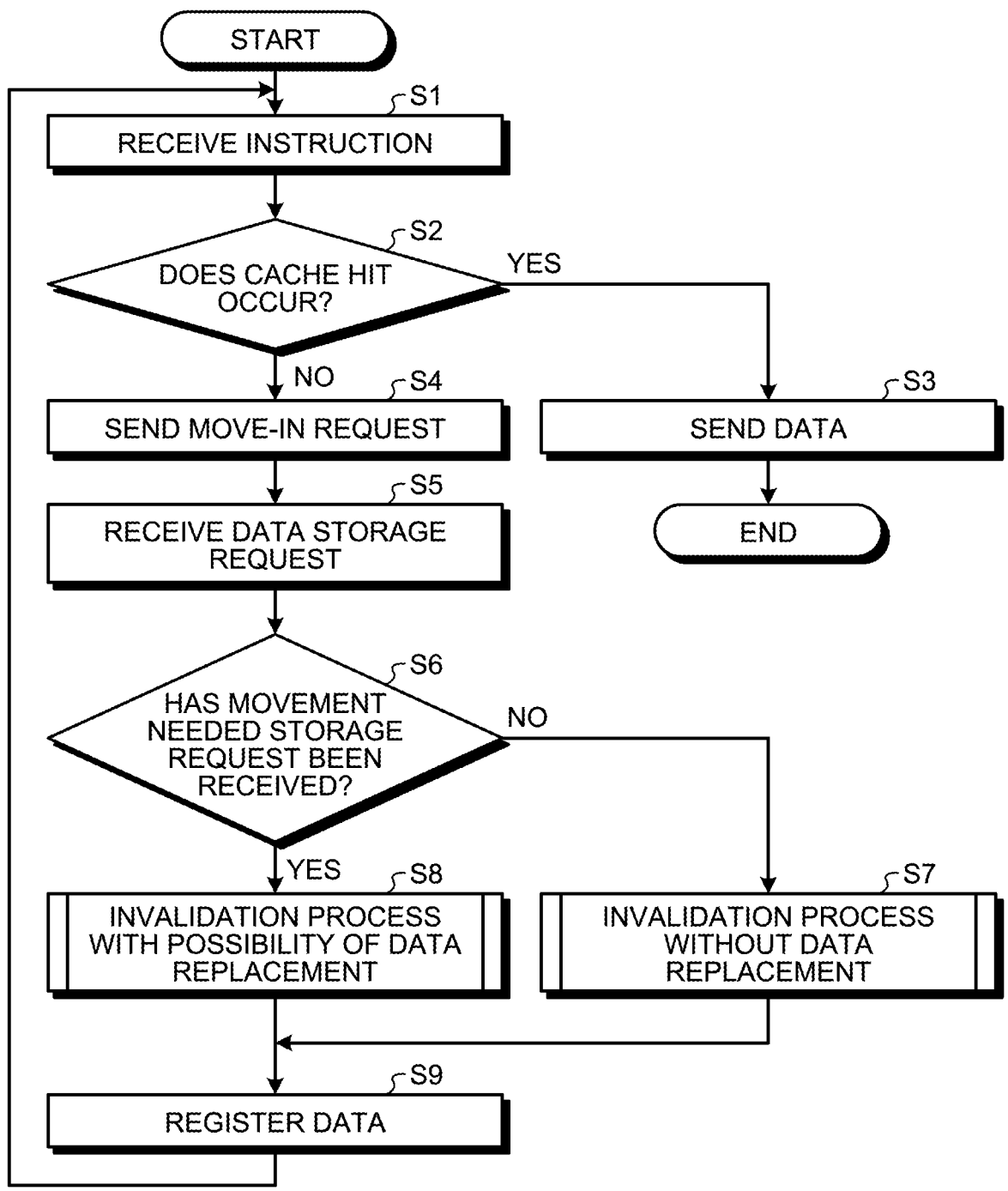
FIG. 4 is a flowchart illustrating a load instruction process performed by the primary cache management unit.

In the following, the flow of a load instruction process performed by the primary cache management unit 103 according to the embodiment will be described with reference to FIG. 4. FIG. 4 is a flowchart illustrating a load instruction process performed by the primary cache management unit.

The primary cache management unit 103 receives a load instruction issued by the instruction control unit 101 (Step S1).

The primary cache management unit 103 determines, by using the information on the tag that has been stored in the L1 tag 352 and the physical address specified by the TLB 304, whether a cache hit occurs (Step S2).

In a case of a cache hit (Yes at Step S2), the primary cache management unit 103 selects the data associated with the acquired tag from the primary data cache 351 and outputs the selected data to the arithmetic processing unit 102 (Step S3).

In contrast, in a case of a cache miss (No at Step S2), the primary cache management unit 103 sends a move-in request to the secondary cache management unit 112 (Step S4).

Thereafter, the primary cache management unit 103 receives a data storage request from the secondary cache management unit 112 (Step S5).

Then, the primary cache management unit 103 determines whether the received data storage request is a movement needed storage request (Step S6).

If the received data storage request is not a movement needed storage request, i.e., if the received request is a movement unneeded storage request (No at Step S6), the primary cache management unit 103 performs an invalidation process that is to be performed without data replacement (Step S7).

In contrast, in a case of a movement needed storage request (Yes at Step S6), the primary cache management unit 103 executes an invalidation process that is to be performed with possibility of data replacement (Step S8).

Thereafter, the primary cache management unit 103 registers the data included in the data storage request in the primary cache 301 (Step S9), and returns to Step S1.

Figure 5:
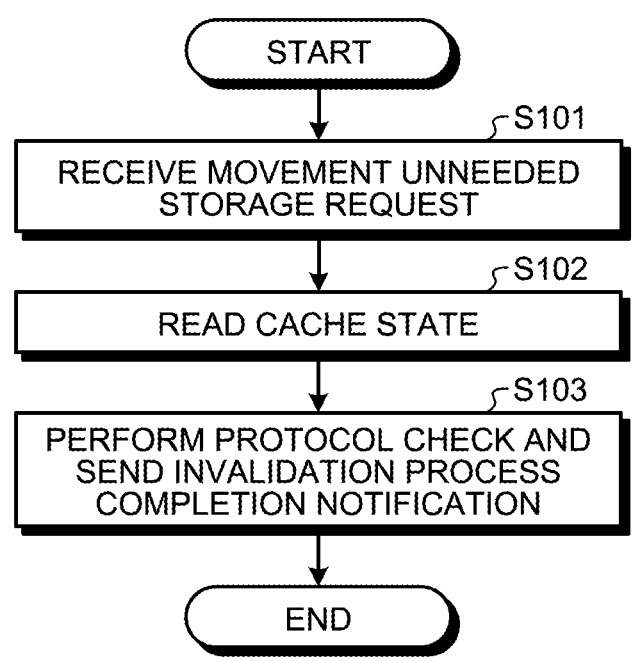
FIG. 5 is a flowchart illustrating an invalidation process in a case of a movement unneeded storage request.

In the following, the flow of an invalidation process in a case of a movement unneeded storage request will be described with reference to FIG. 5. FIG. 5 is a flowchart illustrating an invalidation process in a case of the movement unneeded storage request. The flowchart illustrated in FIG. 5 corresponds to an example of the process performed at Step S7 illustrated in FIG. 4.

The tag management unit 381 in the storage processing unit 308 receives the movement unneeded storage request issued by the secondary cache management unit 112 (Step S101).

Then, the tag management unit 381 acquires a storage destination way of the target data from the movement unneeded storage request. Furthermore, the tag management unit 381 reads, from the L1 tag 352, a cache state of the block that stores therein the data included in the storage destination way (Step S102).

The tag management unit 381 performs a protocol check by checking that the read cache state is the I state. Thereafter, the tag management unit 381 notifies the data management unit 382 in the storage processing unit 308 of the completion of the invalidation process (Step S103).

Figure 6:
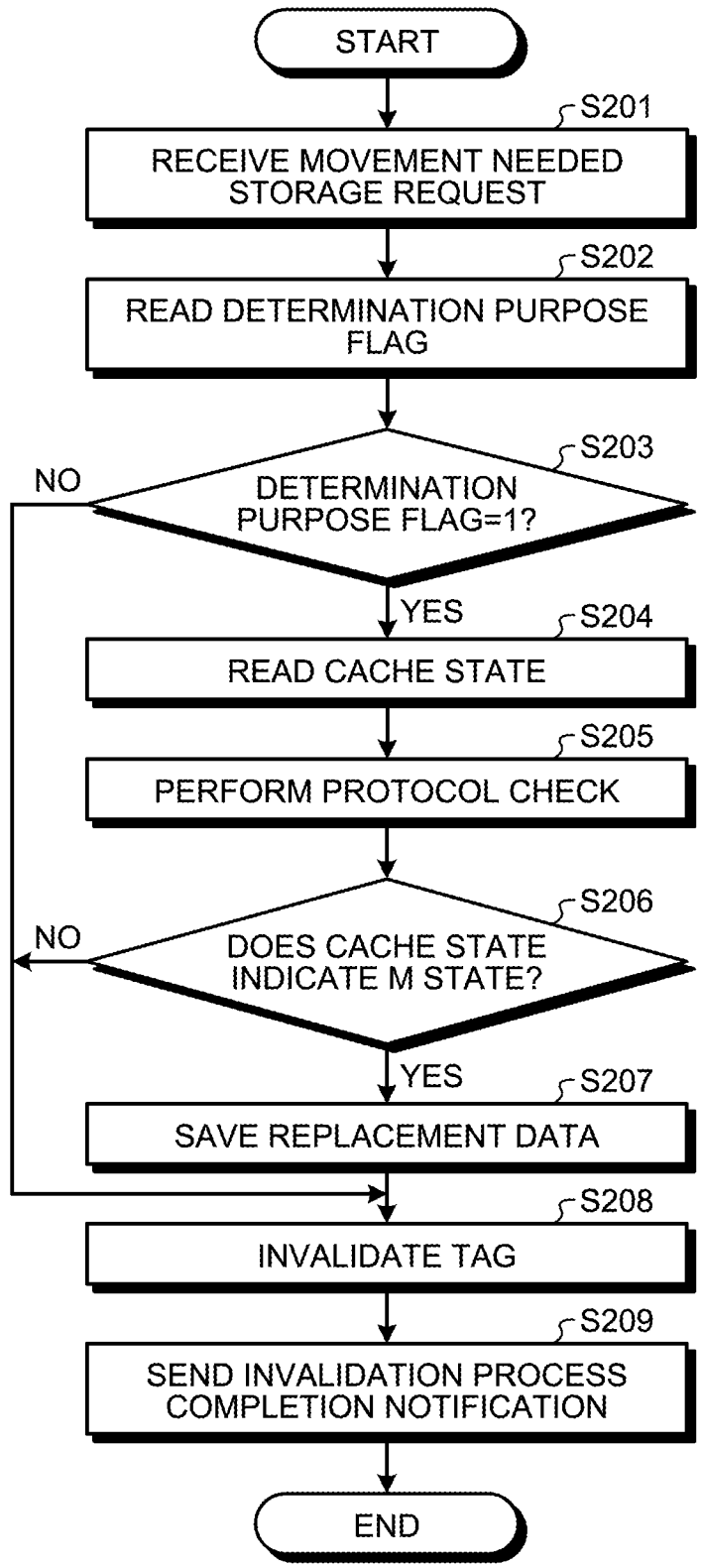
FIG. 6 is a flowchart illustrating an invalidation process in a case of a movement needed storage request.

In the following, the flow of the invalidation process performed in a case of a movement needed storage request will be described with reference to FIG. 6. FIG. 6 is a flowchart illustrating the invalidation process performed in a case of the movement needed storage request. The flowchart illustrated in FIG. 6 corresponds to an example of a process performed at Step S8 illustrated in FIG. 4.

The tag management unit 381 in the storage processing unit 308 receives a movement needed storage request issued by the secondary cache management unit 112 (Step S201).

Then, the tag management unit 381 reads, from the move-in buffer 305, the determination purpose flag associated with the storage destination way designated by the movement needed storage request (Step S202).

Then, the tag management unit 381 determines whether the value of the read determination purpose flag is 1 (Step S203). If the determination purpose flag is 0 (No at Step S203), the storage processing unit 308 proceeds the process to Step S208.

In contrast, if the determination purpose flag is 1 (Yes at Step S203), the tag management unit 381 reads, from the L1 tag 352, the cache state of the block that stores therein the data included in the storage destination way designated by the movement unneeded storage request (Step S204).

Then, the tag management unit 381 performs a protocol check of the MESI by using the read cache state (Step S205).

Furthermore, the tag management unit 381 determines whether the read cache state is the M state (Step S206). If the read cache state is not the M state (No at Step S206), the storage processing unit 308 proceeds the process to Step S208.

In contrast, if the read cache state is the M state (Yes at Step S206), the tag management unit 381 allows the replacement data present in the block that stores therein the target data included in the storage destination way to be saved in the move-out buffer 309 (Step S207).

Then, the tag management unit 381 invalidates the tag associated with the block that stores therein the target data included in the storage destination way included in the L1 tag 352 (Step S208).

Furthermore, the tag management unit 381 notifies the data management unit 382 of the completion of the invalidation process (Step S209).

As described above, the primary cache management unit according to the embodiment sets, when a cache miss occurs, a determination purpose flag indicating whether the cache state of the block that becomes the storage destination of the data sent from the secondary cache is the M state and then performs a move-in request. Thereafter, when the primary cache management unit receives a data storage request that is a response to the move-in request, the primary cache management unit checks the held determination purpose flag. Then, if the determination purpose flag indicates the state other than the M state, the primary cache management unit invalidates, without checking the cache state stored in the L1 tag, the block that stores therein the data.

Consequently, when a cache miss occurs, the primary cache management unit can reduce the number of accesses to the L1 tag and shorten the time taken for a response process. Consequently, it is possible to improve the processing performance in the event of a primary cache miss in the information processing apparatus.

[b] Second Embodiment

Figure 7:
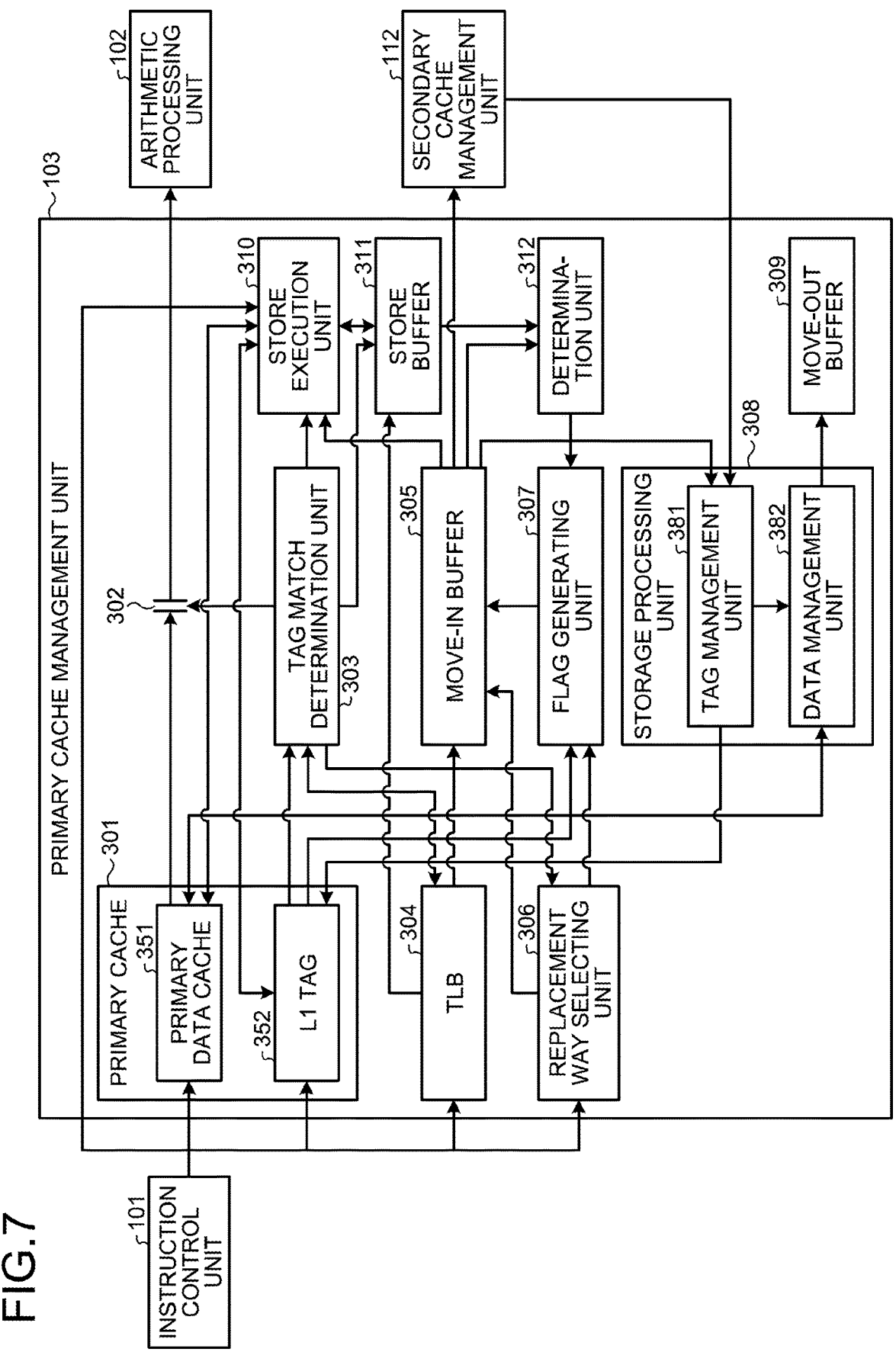
FIG. 7 is a block diagram illustrating a primary cache management unit according to a second embodiment.

FIG. 7 is a block diagram illustrating a primary cache management unit according to a second embodiment. The primary cache management unit 103 according to the embodiment includes, in addition to each of the units described in the first embodiment illustrated in FIG. 2, a store execution unit 310, a store buffer 311, and a determination unit 312. The primary cache management unit 103 according to the embodiment differs from the first embodiment in that a determination purpose flag is set by considering an execution state of a store instruction. In the description below, a description of the function of each of the same unit as that described in the first embodiment will be omitted.

The L1 tag 352 receives a store instruction to store a cache from the instruction control unit 101. Then, the L1 tag 352 outputs, to the tag match determination unit 303, the information on the tag of the data that is to be stored and that has been designated by the store instruction.

The TLB 304 receives the store instruction to store the cache from the instruction control unit 101. Then, the TLB 304 transforms the logical address designated by the store instruction to a physical address and outputs the information to the tag match determination unit 303 and a store buffer 31.

The tag match determination unit 303 receives an input of the information on the tag of the data that is to be stored from the L1 tag 352. Furthermore, the tag match determination unit 303 receives an input of the physical address from the TLB 304. Then, the tag match determination unit 303 performs determination of a tag match by using the acquired tag and the physical address.

In a case of a tag match, the tag match determination unit 303 outputs, to the store buffer 311, the information on the way of the block in which a tag match has occurred and the information indicating that a cache hit has occurred. Furthermore, the tag match determination unit 303 notifies the store execution unit 310 of the tag match.

The store execution unit 310 receives an input of the store instruction from the instruction control unit 101. Then, if a tag match does not occur, the store execution unit 310 receives a notification of a tag miss from the tag match determination unit 303. In this case, the store execution unit 310 selects a block that is used to store the data from the primary data cache 351 and then stores the data designated by the store instruction in the selected block. Furthermore, the store execution unit 310 registers, in the L1 tag 352, the tag indicating the stored data, the valid information indicating valid, and the cache state of the block at the storage destination of the data.

In contrast, in a case of a tag match, the store execution unit 310 receives an input of the information on the way in which a tag match occurs from the tag match determination unit 303 together with a notification of the tag match. Then, the store execution unit 310 checks whether an entry having the information on the same physical address and the way is present in the move-in buffer 305 and whether the determination purpose flag of the entry is 0.

If the entry having the information on the same physical address and the way is not present, the store execution unit 310 sets the cache hit flag associated with the information on the subject physical address and the way stored in the store buffer 311 to 1. Then, the store execution unit 310 performs storing of the data in the primary data cache 351 and the L1 tag 352.

Furthermore, in a case where the entry having the information on the same physical address and the way is present but the determination purpose flag is 1, the store execution unit 310 also sets the cache hit flag associated with the information on the subject physical address and the way stored in the store buffer 311 to 1. Then, the store execution unit 310 performs storing of the data in the primary data cache 351 and the L1 tag 352.

In contrast, in a case where the entry having the information on the same physical address and the way is present and the determination purpose flag is 0, the store execution unit 310 sets the cache hit flag associated with the information on the subject physical address and the way stored in the store buffer to 0. Then, the store execution unit 310 waits the store process to be performed. Thereafter, the store execution unit 310 repeatedly checks the move-in buffer 305 and performs the store process after the entry that has the same physical address and information on the way is not present or after the determination purpose flag becomes 0. The cache hit flag mentioned here corresponds to an example of information indicating an "update status of data with respect to a predetermined area".

The store buffer 311 receives an input of the information on the physical address from the TLB 304. Furthermore, the store buffer 311 receives information on the way of the tag matched data and information indicating a cache hit from the tag match determination unit 303. Furthermore, the store buffer 311 sets, in accordance with an instruction from the store execution unit 310, a cache hit flag associated with the address information and the information on the way.

Namely, if a move-in request with respect to the same physical address and the way has already been issued and if the determination purpose flag is 0, the cache hit flag in the store buffer 311 is set to 0. Furthermore, if a move-in request with respect to the same physical address and the way has not been issued or if a move-in request with respect to the same physical address and the way has been issued but the determination purpose flag is 1, the cache hit flag in the store buffer 311 is set to 1.

If the load instruction is output from the instruction control unit 101 and a tag miss occurs, the determination unit 312 acquires the information on the physical address and the storage destination way stored in the move-in buffer 305. Then, the determination unit 312 determines whether the entry that stores therein the same physical address and the storage destination way as the acquired physical address and the storage destination way is stored in the store buffer 311. If the entry that stores therein the same physical address and the same storage destination way are not stored in the store buffer 311, the determination unit 312 notifies the flag generating unit 307 that setting of a flag is available.

In contrast, if the entry that stores therein the same physical address and the same storage destination way are stored in the store buffer 311, the determination unit 312 checks a cache hit flag of the subject entry. If the cache hit flag is 1, the determination unit 312 notifies the flag generating unit 307 that setting of a flag is prohibited.

The flag generating unit 307 acquires information on the storage destination way from the replacement way selecting unit 306. Then, the flag generating unit 307 acquires, by using the acquired information on the storage destination way, the cache state of the block included in the storage destination way from the L1 tag 352.

If the acquired cache state is the M state, the flag generating unit 307 sets the determination purpose flag associated with the storage destination way to 1.

In contrast, if the acquired cache state is other than the M state and if the flag generating unit 307 has received a notification that setting of a flag is possible from the determination unit 312, the flag generating unit 307 sets the determination purpose flag associated with the subject way to 0. In contrast, if the flag generating unit 307 has received a notification that setting of a flag is prohibited from the determination unit 312, the flag generating unit 307 sets the determination purpose flag associated with the subject way to 1. Thereafter, the flag generating unit 307 outputs the determination purpose flag to the move-in buffer 305 together with the information on the associated way.

The storage processing unit 308 performs the same process as that performed in the first embodiment. Specifically, if the acquired data storage request is a movement needed storage request, the tag management unit 381 acquires the value of the determination purpose flag of the storage destination way from the move-in buffer 305. Then, if the value of the determination purpose flag is 1, the tag management unit 381 acquires, from the L1 tag 352, the cache state of the block that stores therein the target data included in the storage destination way. Then, if the cache state is the M state, the tag management unit 381 instructs the data management unit 382 to save the data. After the data management unit 382 has saved the data, the tag management unit 381 invalidates the L1 tag 352 in the block that stores therein the target data included in the storage destination way. Then, the tag management unit 381 instructs the data management unit 382 to store the target data acquired from the secondary cache management unit 112. Furthermore, the tag management unit 381 generates a tag indicating the target data stored in the primary data cache 351, registers the generated tag in the L1 tag 352, and furthermore registers the S state as the cache state of the block of the way that stores therein the target data.

In contrast, if the value of the determination purpose flag is 0, because the cache state is not the M state, the tag management unit 381 invalidates the L1 tag 352 in the block that stores therein the target data in the storage destination way. Thereafter, the tag management unit 381 instructs the data management unit 382 to store the target data acquired from the secondary cache management unit 112. Furthermore, the tag management unit 381 generates a tag indicating the stored target data, registers the generated tag in the L1 tag 352, and also registers the S state as the cache state of the block of the way that stores therein the target data.

In the following, the state of the L1 tag 352 in a case where conflict occurs between a store instruction and a load instruction output by the primary cache management unit 103 according to the embodiment will be described with reference to FIGS. 8 and 9. FIG. 8 is a diagram illustrating a transition of an L1 tag when contention occurs in a state in which a store instruction is preceded. FIG. 9 is a diagram illustrating transition of the L1 tag when contention occurs in a state in which a load instruction is preceded. FIGS. 8 and 9 indicate that time elapses in a downward direction of the diagrams. A process S indicates a process of a store instruction. Furthermore, a process L indicates a process of a load instruction.

In a case where a store instruction is performed first, as illustrated in FIG. 8, the process S is started at time T0. In this case, because no entry is stored in the move-in buffer 305, an index A indicating a physical address and w0 as the information on the way are registered in the store buffer 311 and the cache hit flag is set to 1. Then, in an L1 tag 252 that is in a state 201, the block associated with the index A and w0 is the E state and the process S for storing the data stored in the subject block is performed.

Then, at time T1 at which the process S is being performed, a load instruction is issued and a process L is started. At this time, the index A and w0 are registered in the move-in buffer 305. Then, the determination unit 312 checks the store buffer 311 and specifies the entry having the index A and w0 stored in the move-in buffer 305. Furthermore, the determination unit 312 checks that the cache hit flag of the specified entry is 1 and notifies the flag generating unit 307 that the setting of a flag is prohibited. The flag generating unit 307 sets the determination purpose flag associated with the index A and w0 in the move-in buffer 305 to 1.

Because the process S has been performed, storing the block associated with the index A and w0 in the L1 tag 252 is performed and the block enters, as indicated by a state 202, the state from the E state to the M state as a transition. Then, if the store instruction has been completed at time T2, the load instruction is started. In this case, because the determination purpose flag stored in the move-in buffer 305 is 1, the tag management unit 381 allows the move-out buffer 309 to save the data, which is stored in the block associated with the index A and w0, in the data management unit 382. Thereafter, the tag management unit 381 invalidates the tag of the index A and w0 in the L1 tag 352. Consequently, the L1 tag 352 becomes a state 203.

In this way, if a load instruction has been issued in a state in which a store process has been performed, the primary cache management unit 103 according to the embodiment sets the determination purpose flag to 1 and performs a load process to be performed in a case of the M state. Consequently, it is possible to reliably save the data even if the data has been updated by the store process and the block that was in the E state transits to the M state.

In the following, in a case where a load instruction is performed first will be described. As illustrated in FIG. 9, in the L1 tag 352, as indicated by a state 211, the block indicated by the index A and w0 is in the E state. Furthermore, because no store instruction has been issued, the store buffer 311 does not have an entry of the index A and w0 as indicated by a state 216.

Then, the process L is started at time T3. In this case, the index A and w0 are registered in the move-in buffer 305. Then, the determination unit 312 confirms that the entry in which the index A and w0 has been registered is not present in the store buffer 311. Thus, the determination unit 312 notifies the flag generating unit 307 that the setting of a flag is available. In response to a notification that setting a flag is available, the flag generating unit 307 sets the determination purpose flag associated with the index A and w0 in the move-in buffer 305 indicated by a state 214 to 1.

Thereafter, the process S is started at time T4. In this case, because the index A and w0 has already been registered in the move-in buffer 305, the index A and w0 is registered in the store buffer 311 and, as indicated by a state 217, the cache hit flag is set to 0. Because the cache hit flag is 0, the store execution unit 310 waits the data to be stored.

Thereafter, the tag associated with the index A and w0 is invalidated without checking the cache state held by the L1 tag 352 performed by the process L. Then, the process L at time T5 has been completed and, as indicated by a state 212, the block indicated by the index A and w0 in the L1 tag 352 transits to the I state. Furthermore, the entry of the index A and w0 is deleted from the move-in buffer 305. If the entry of the index A and w0 has been deleted from the move-in buffer 305, as indicated by a state 218, the cache hit flag associated with the index A and w0 in the store buffer 311 is set to 1. Because the cache hit flag becomes 1, the store execution unit 310 starts storing the data. Namely, the store process is waited between time T4 and time T5.

Thereafter, when the process S has been completed, because the data in the block indicated by the index A and w0 is update, the cache state associated with the index A and w0 in the L1 tag 352 is transited to the M state indicated by a state 213.

In the following, a transition of an L1 tag 232 in a case where the store buffer 311 is not used will be described with reference to FIG. 10. FIG. 10 is a diagram illustrating transition of the L1 tag at the time of contention in a case where a store buffer is not used.

In this case, as illustrated in FIG. 10, the L1 tag 352 holds the E state as the cache state of the block indicated by the index A and w0 as indicated by a state 221. Then, the process L is started at time T6. In this case, in the move-in buffer 305, 0 is set as the determination purpose flag associated with the index A and w0.

Thereafter, the process S is started at time T7. In this case, the process S is not waited and the data in the block indicated by the index A and w0 is updated. Consequently, as indicated by a state 222, a transition of the block indicated by the index A and w0 in the L1 tag 352 enters the M state.

However, because the determination purpose flag of the move-in buffer 305 indicates 0, the tag management unit 381 invalidates the tag associated with the index A and w0 without checking the cache state of the block indicated by the index A and w0 held by the L1 tag 352. In this case, because the data stored in the block that is in the M state is not saved, data corruption occurs.

In contrast, the primary cache management unit 103 according to the embodiment allows a store instruction to wait until the completion of the load process if a store instruction is issued in a state in which the load process has been performed and, then, performs the store process. Consequently, it is possible to avoid a transition of the block to the M state caused by the store process performed during the load process and it is possible to suppress the occurrence of data corruption by reliably saving the data.

Furthermore, in the description above, a process performed in a case where, in a hierarchical cache having a primary cache and a secondary cache, a cache miss occurs in the primary cache has been described. However, the function described in the embodiments can be used in any hierarchies in the hierarchical cache and, furthermore, the number of hierarchies in the hierarchical cache is not particularly limited.

According to an aspect of the present invention, it is possible to improve the processing performance of the information processing apparatus.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a plurality of arithmetic processing devices, each of the arithmetic processing devices includes:
a cache memory that holds data and state information on an area in which the data is stored, the state information indicating one of a plurality of states of the area in which the data is held, the states including a state in a modification type, that is the state in which a write back operation is executed for updated data,
a determination unit that determines, in response to an acquisition request for predetermined data, whether the predetermined data is present in the cache memory,
a control unit that outputs, when the predetermined data is not present in the cache memory, the acquisition request for the predetermined data to a low level cache memory at a level lower than the cache memory or to a storage device and that holds determination purpose information based on the state information on a predetermined area that stores therein the predetermined data, the determination purpose information indicating whether the state of the predetermined area is in the modification type, and
a storage processing unit that acquires a response to the acquisition request from the low level cache memory or the storage device, that determines, when the acquired response is a predetermined type, based on the determination purpose information held by the control unit, whether the state information stored in the cache memory is to be acquired, that invalidates the predetermined area when the storage processing unit determines not to acquire the state information as the determination purpose information indicating that the state of the predetermined area is not in the modification type, and that stores, in the predetermined area, the predetermined data included in the response.

2. The information processing apparatus according to claim 1, wherein, when the storage processing unit determines to acquire the state information, the storage processing unit
acquires the state information from the cache memory,
saves existing data held by the predetermined area when the acquired state information is in a first state,
invalidates the predetermined area,
stores the predetermined data in the predetermined area,
invalidates the predetermined area when the acquired state information is in a second state, and
stores the predetermined data in the predetermined area.

3. The information processing apparatus according to claim 1, wherein, when the response is not the predetermined type, the storage processing unit acquires the state information from the cache memory, checks the state information, and stores the predetermined data in the predetermined area.

4. The information processing apparatus according to claim 1, wherein
the cache memory includes a data storage unit and a tag storage unit that stores therein search information on the data and the state information,
the determination unit determines whether the predetermined data is present in the data storage unit based on the search information held by the tag storage unit,
the control unit outputs, when the predetermined data is not present in the data storage unit, the acquisition request for the predetermined data to the cache memory at the lower level or the storage device, acquires the state information on a storage destination area of the predetermined data in the data storage unit from the tag storage unit, and generates and holds the determination purpose information, and
the storage processing unit includes
a tag management unit that invalidates, when the storage processing unit determines not to acquire the state information, an associated area in the tag storage unit that holds information related to the storage destination area and that stores, in the associated area, the search information on the predetermined data and the state information on the storage destination area, and
a data management unit that stores the predetermined data in the storage destination area.

5. The information processing apparatus according to claim 1, wherein, when the response is a response having a type of request for data movement, the storage processing unit determines, based on the determination purpose information held by the control unit, whether the state information stored in the cache memory is to be acquired.

6. The information processing apparatus according to claim 1, wherein, the storage processing unit, when determining the predetermined data is present in the low level cache memory or the storage device based on the determination purpose information held by the control unit, determines not to acquire the state information stored in the cache memory.

7. The information processing apparatus according to claim 1, wherein the control unit holds the determination purpose information that is based on the state information on the predetermined area at a storage destination of the predetermined data held by the cache memory and based on an update status of data with respect to the predetermined area.

8. An arithmetic processing device comprising:
a cache memory that holds data and state information on an area in which the data is stored, the state information indicating one of a plurality of states of the area in which the data is held, the states including a state in a modification type, that is the state in which a write back operation is executed for updated data;
a determination unit that determines, in response to an acquisition request for predetermined data, whether the predetermined data is present in the cache memory;
a generating unit that generates determination purpose information based on the state information on a predetermined area at the storage destination of the predetermined data held by the cache memory;
a control unit that outputs, when the predetermined data is not present in the cache memory, the acquisition request for the predetermined data to a low level cache memory at a level lower than the cache memory or a storage device and that holds the determination purpose information generated by the generating unit, the determination purpose information indicating whether the state of the predetermined area is in the modification type; and
a storage processing unit that acquires a response to the acquisition request from the low level cache memory or the storage device, that determines, when the acquired response is a predetermined type, based on the determination purpose information held by the control unit, whether the state information stored in the cache memory is to be acquired, that invalidates the predetermined area when the storage processing unit determines not to acquire the state information as the determination purpose information indicating that the state of the predetermined area is not in the modification type, and that stores, in the predetermined area, the predetermined data included in the response.

9. A method of controlling an information processing apparatus that includes a plurality of arithmetic processing devices having mounted thereon a cache memory that holds data and state information on an area in which the data is stored, the state information indicating one of a plurality of states of the area in which the data is held, the states including a state in a modification type, that is the state in which a write back operation is executed for updated data, the method for controlling the information processing apparatus causing each of the arithmetic processing devices to perform a process comprising:

determining, in response to an acquisition request for predetermined data, whether the predetermined data is present in the cache memory;

outputting, when the predetermined data is not present in the cache memory, the acquisition request for the predetermined data to a low level cache memory at a level lower than the cache memory or to a storage device and holding determination purpose information based on the state information on a predetermined area at a storage destination of the predetermined data, the determination purpose information indicating whether the state of the predetermined area is in the modification type;

acquiring a response to the acquisition request from the low level cache memory or the storage device;

determining, when the acquired response is a predetermined type, based on the determination purpose information, whether or not to acquire the state information stored in the cache memory; and invalidating, when it is determined not to acquire the state information as the determination purpose information indicating that the state of the predetermined area is not in the modification type, the predetermined area and storing, in the predetermined area, the predetermined data included in the response.

* * * * *